Figure 1:
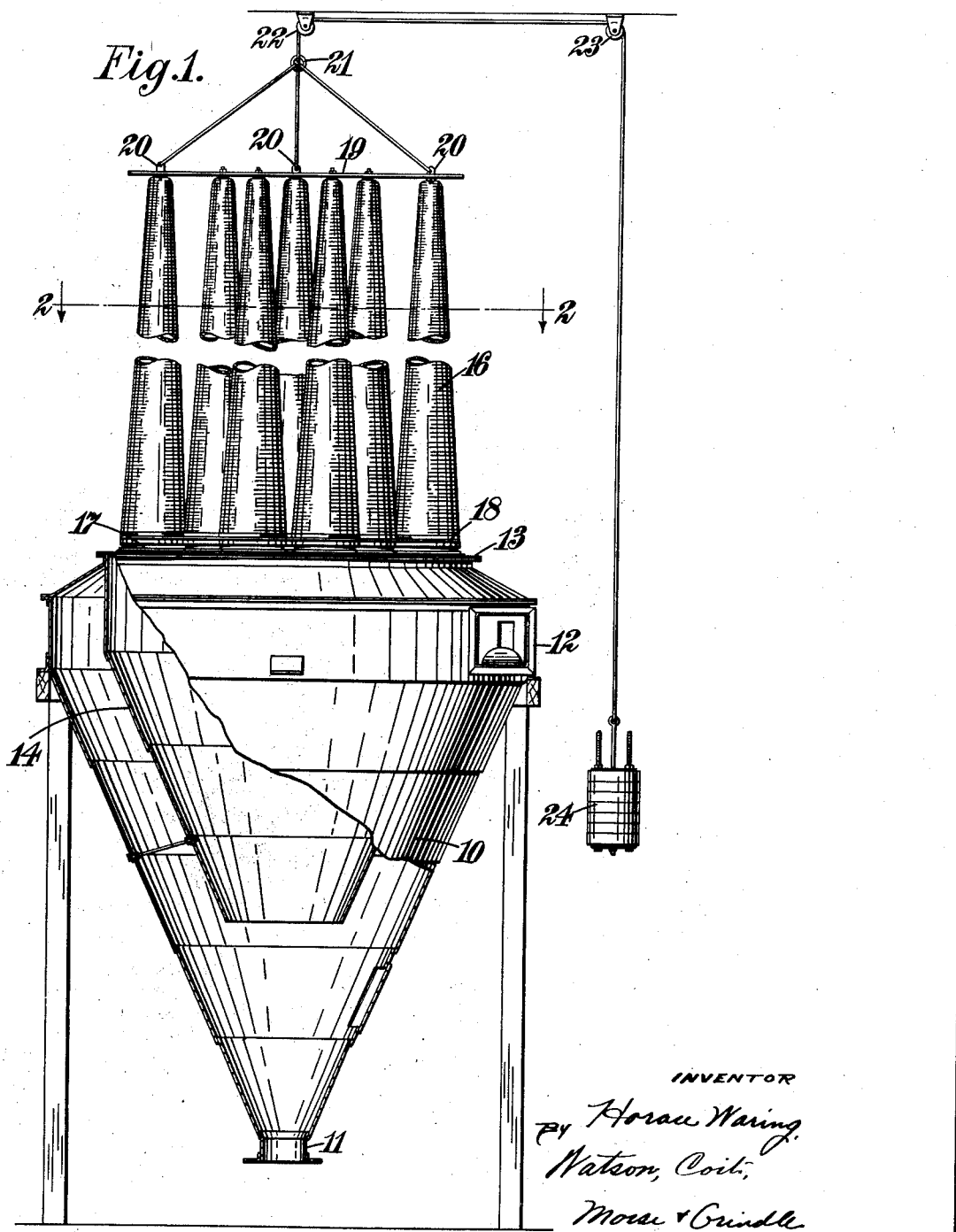

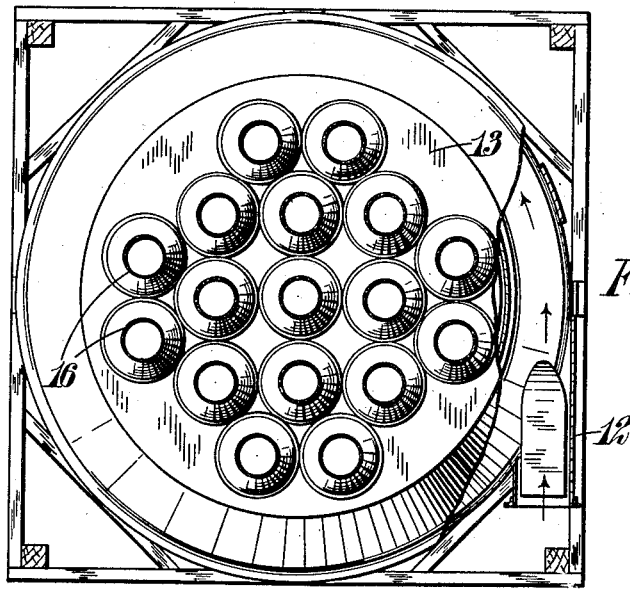
Fig.2.
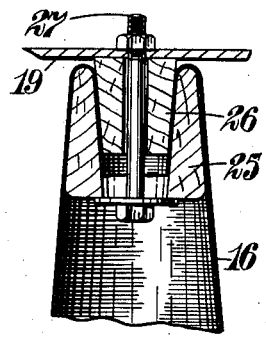
Fig.3.
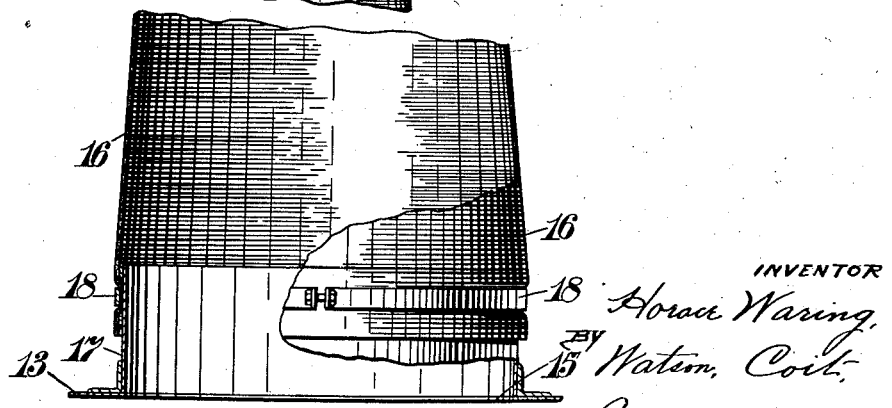

Patented June 3, 1930

1,761,377

UNITED STATES PATENT OFFICE

HORACE WARING, OF LANCASHIRE, ENGLAND, ASSIGNOR TO ASSOCIATED LEAD MANUFACTURERS LIMITED, OF LONDON HOUSE, LONDON, ENGLAND, A BRITISH COMPANY

APPARATUS FOR COLLECTING SUSPENDED DUST

Application filed March 9, 1927, Serial No. 174,006, and in Great Britain August 28, 1926.

This invention comprises improvements in or relating to apparatus for separating dust from suspension in gases and vapours. The term "dust" is used herein as including all fine suspended solid matter of whatever origin and whether valuable or not. For example, it includes not only undesired suspended particles (coke dust, sawdust, fibre etc.) from which a gas is to be washed or freed, but also desired particles such as oxides of lead or the zinc oxide or fume produced in the manufacture of zinc pigments, or other materials.

It is frequently necessary to separate dust from gases or vapours by means which do not involve scrubbing with liquors, and one common method of effecting such separation is to filter the dust-laden gases or vapours through tubular filter-bags, generally of textile material; such bags generally have an inlet at the upper end, the gases pass out through the walls of the bags, the dust collects on the inside of the walls and the bags are periodically shaken to cause the collected dust to descend to the bottom, where it is stored for removal. One difficulty which arises from the employment of such filtering apparatus is that the dust, in collecting upon the walls of the filter-bags, after some time tends to clog the pores and consequently to render necessary the employment of an unduly high pressure to force the gases through the walls of the bag. At the same time the weight of the accumulated dust imposes an additional strain upon the material. Consequently the life of the bags is reduced. Again, the means for shaking the bags require constant attention. It is an object of the present invention to overcome these disadvantages and to provide apparatus of increased efficiency.

According to the present invention apparatus for separating dust from suspension in gases and vapours is characterized by a tubular upright filter-bag or bags provided with an inlet for the dust-laden gases, the walls of which bag, considered in a direction from the bottom toward the top, are tapered inwardly. It is found that by tapering the walls inwardly the tendency of the dust to adhere to the interior surface of the bag is overcome and as soon as a small quantity of dust has collected upon the walls this falls automatically by gravity away from the walls of the bag.

In one form the inlet to the bag or bags is coaxially disposed at the bottom thereof. The bag or bags may be conical in formation and taper to their smallest diameter at the top.

There may be combined with this apparatus means for delivering dust-laden gases to said inlet and for causing the gases to pass the walls of said bag. Such means may comprise a settling chamber (for example a cyclonic separator) at the bottom of the filter-bag or bags, the outlet from the chamber leading directly to the inlet of the bag or bags. The advantage of the settling chamber is that a large portion of the dust is eliminated before the admission of the gases to the bags and the dust which falls from the bags moreover deposits itself directly into the settling chamber along with the initially separated dust collected therein. This is a feature of considerable practical importance.

The invention includes in apparatus for separating dust from suspension in gases or vapours the combination of an upright tubular filter-bag or bags provided with an inlet at the bottom, a settling chamber (for example a cyclonic separator) at the bottom of the filter-bag or bags (the outlet from the chamber leading directly to the inlet of the bags) and means to support the upper ends of the bag or bags and hold them in extended position.

The upper ends of the bags may be yieldingly supported, for example by a counterweight. This has the effect of keeping the bags at a constant tension. In the event of any unusual accumulation of dust occurring which does not automatically fall off the interior of the bag surface, the weight of the accumulation will auntomatically overcome the yielding supporting force and the tension will be removed so that the bags become slack, with the result that the dust is automatically dislodged.

One form of apparatus in accordance with the invention is illustrated in the accompanying drawings in which:—

Figure 1 is a side elevation of the apparatus, parts being broken away to show the interior thereof, Figure 2 is a cross-section on line 2—2 of Figure 1, and Figure 3 is a detail in vertical section on a larger scale of one of the filter-bags.

A conical settling chamber 10 having its apex 11 at the bottom is provided, and an inlet 12 to this chamber is tangential and disposed near the top at the portion of greatest diameter. The top of the chamber is closed by a cover 13 and carries an internal cone 14, open at the bottom, the sides of which are more or less parallel with the external walls of the settling chamber 10. This apparatus constitutes one type of cyclonic separator in which the dust-laden gases upon entry are caused to whirl in a spiral conical path which throws out a large proportion of the dust by centrifugal action. The gases thus partially freed from dust pass into the inner cone 14 by its lower opening and are there brought to a state of comparative quiescence.

The top of the settling chamber 10 above the inner cone 14 is provided with a number of openings 15 (see Figure 3). The openings are circular in shape and serve as inlets to the bottoms of filter-bags 16.

Each bag 16 is made conical and tapers to a smaller diameter at the top. The diameter at the bottom may be about 18 inches and the length of the bag may be about 12 feet. The material of which the bags are made may be stout hessian or other usual material. Each bag is affixed at its base over one of the openings in the top of the separator by means of an upstanding flange 17 which enters the bottom of the bag, and a surrounding band 18.

The upper ends of the bags are all secured by a circular wedge clamp 25, 26 and bolt 27 to a steel plate 19, the centre of which is provided with eyes 20. To the eyes are affixed steel cables which unite at 21 and pass over pulleys 23 to a balance-weight 24 for keeping the bags in tension.

In operation much of the dust separates out in the cyclonic separator. The partially purified gases thence pass into the conical filter-bags 16 in an upward direction and diffuse through the walls. The remaining dust collects on the interior of the walls and periodically detaches itself therefrom and falls into the settling chamber below, whence it may be collected as desired.

If it should at any time be necessary to impart a shake to the bags to assist the fall of the dust, this can be done by lifting the counterweight 24 and allowing it to drop. Normally, however, such shaking is obviated or very much reduced by the shape of the bags according to the present invention as compared with the amount of shaking required by the usual slack parallel bags.

In practice it is found that when an apparatus of the type described is in operation, the conical bags constantly vibrate in an upward and downward direction so that the inner surfaces of the bags do not become choked with dust and are thus automatically self-cleansing.

If it is desired to retain the gases for use, the bags would be surrounded by a gas-collecting chamber. The dust-laden gases are preferably blown into the apparatus by a suitable fan but their passage may be assisted if desired by maintaining suction in the gas-collecting chamber, where such is provided.

If desired the bags can be cleaned of any material which may lodge in the pores of the walls thereof at any time, by applying a pulsating or alternating air-pressure to the apparatus. Again, the passage of the material through the walls of the bags may, if desired, be assisted by suction outside them.

I claim:—

1. In an apparatus for separating dust from suspension in gases and vapours the combination of an upright tubular filter-bag, the walls of which, considered in a direction from the bottom toward the top, are tapered inwardly and which is provided with an inlet for dust-laden gases, yielding means attached to the upper end of the bag of such strength as to balance its weight, when free of dust but to yield to a predetermined additional weight less than that of the maximum amount of dust capable of clinging to the interior surface of the bag and means for delivering dust-laden gases to said inlet and for causing the gases to pass through the walls of said bag.

2. In an apparatus for separating dust from suspension in gases and vapours the combination of a plurality of upright tubular filter-bags, the inlets in said bags for dust-laden gases being in communication with a gas-supply chamber, and yielding means attached to the upper ends of said bags of such strength as to balance their weight, when free of dust but to yield to a predetermined additional weight less than that of the maximum amount of dust capable of clinging to the interior surface of the bag, the walls of said bags, considered in a direction from the bottom toward the top, being tapered inwardly and extending in a straight line from the bottom up to the point of attachment to the yielding means of support.

3. In an apparatus for filtering dust from gases and vapours, a dust filtering unit comprising a conical filtering member of flexible material disposed with its axis substantially vertical and its apex uppermost, and a counter-weight for supporting said bag when free of dust but so arranged as to permit the same to deform under the weight of a predetermined accumulation of dust to thereby dislodge the dust, said means serving to restore said bag to its original shape when the dust has been dislodged.

4. In an air filtering apparatus, the combination with a deformable, normally tapered bag having a base and an apex, of a support for said base, a support for said apex, said supports being relatively movable, and means yieldably holding said relatively movable supports in spaced relation with the walls of the bag taut, the action of said means being overcome by the weight of the dust collected on the walls of the bag, allowing the bag to deform to dislodge the dust, whereupon the means becomes active to restore the bag to its normal shape.

5. In an apparatus for filtering dust from gases and vapours, a dust filtering unit comprising a plurality of conical filtering members of flexible material disposed with their axes substantially vertical and their apices uppermost, and a balance weight for supporting the said bags when free of dust but of such weight as to permit the same to deform under the weight of a predetermined accumulation of dust to thereby dislodge the dust, said means serving to restore the said bags to their original shape when the dust has been dislodged.

6. In an air filtering apparatus the combination with a plurality of deformable normally tapered bags having bases and apices, of a support for the said bases and a support for the said apices, the said supports being relatively movable, and yielding means holding said relatively movable supports in spaced relation with the walls of the bags when taut, said yielding means being of such strength as may be overcome by the weight of a predetermined quantity of dust collected on the walls of the bags, allowing the bags to deform to dislodge the dust whereupon the means becomes active to restore the bags to their normal shape.

In testimony whereof I affix my signature.

HORACE WARING.